March 30, 1926.
A. J. DAVIS
1,578,267
PASTEURIZING APPARATUS
Filed Nov. 24, 1925
4 Sheets-Sheet 1
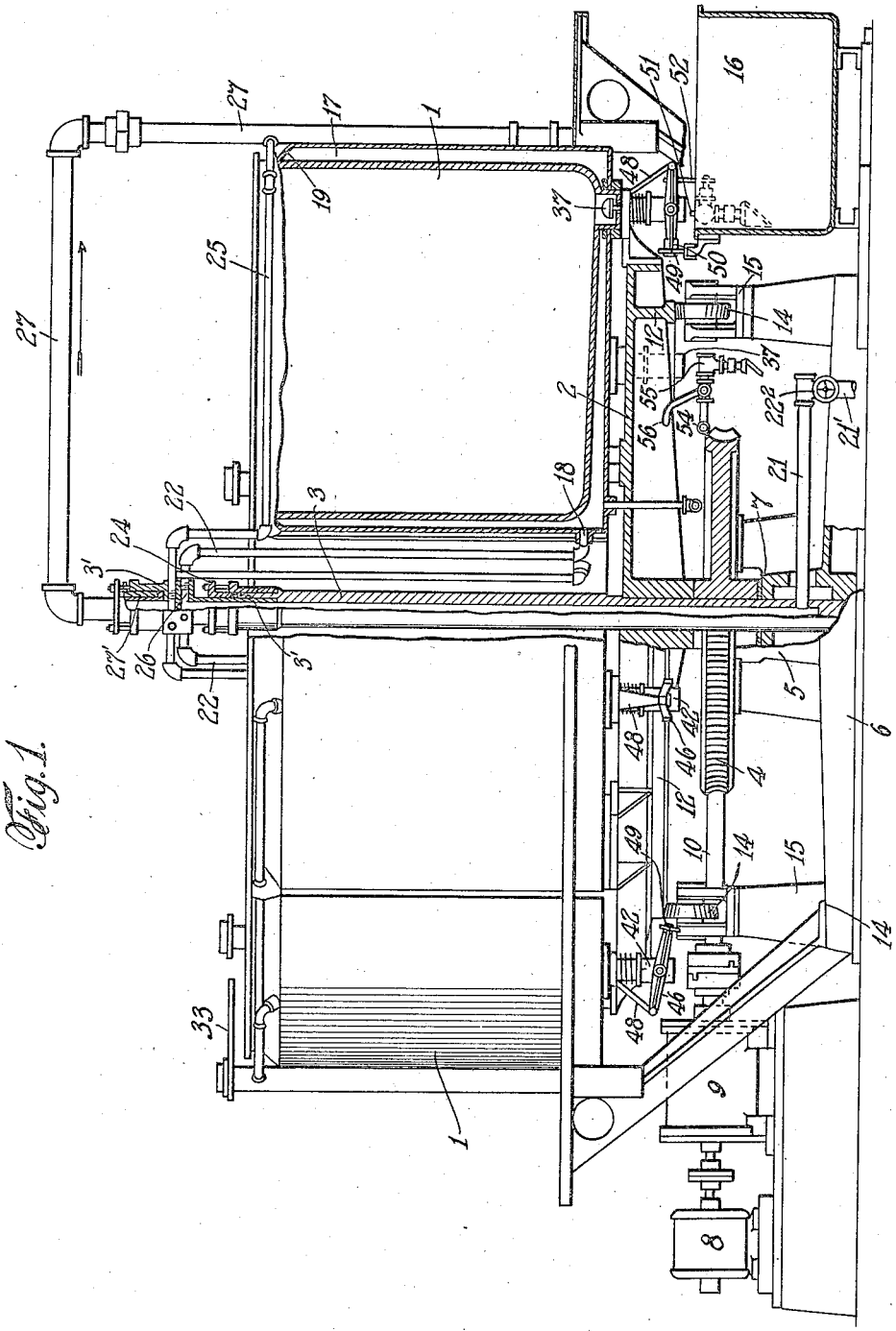
INVENTOR
Albert J Davis
BY Kenyon & Kenyon
ATTORNEYS

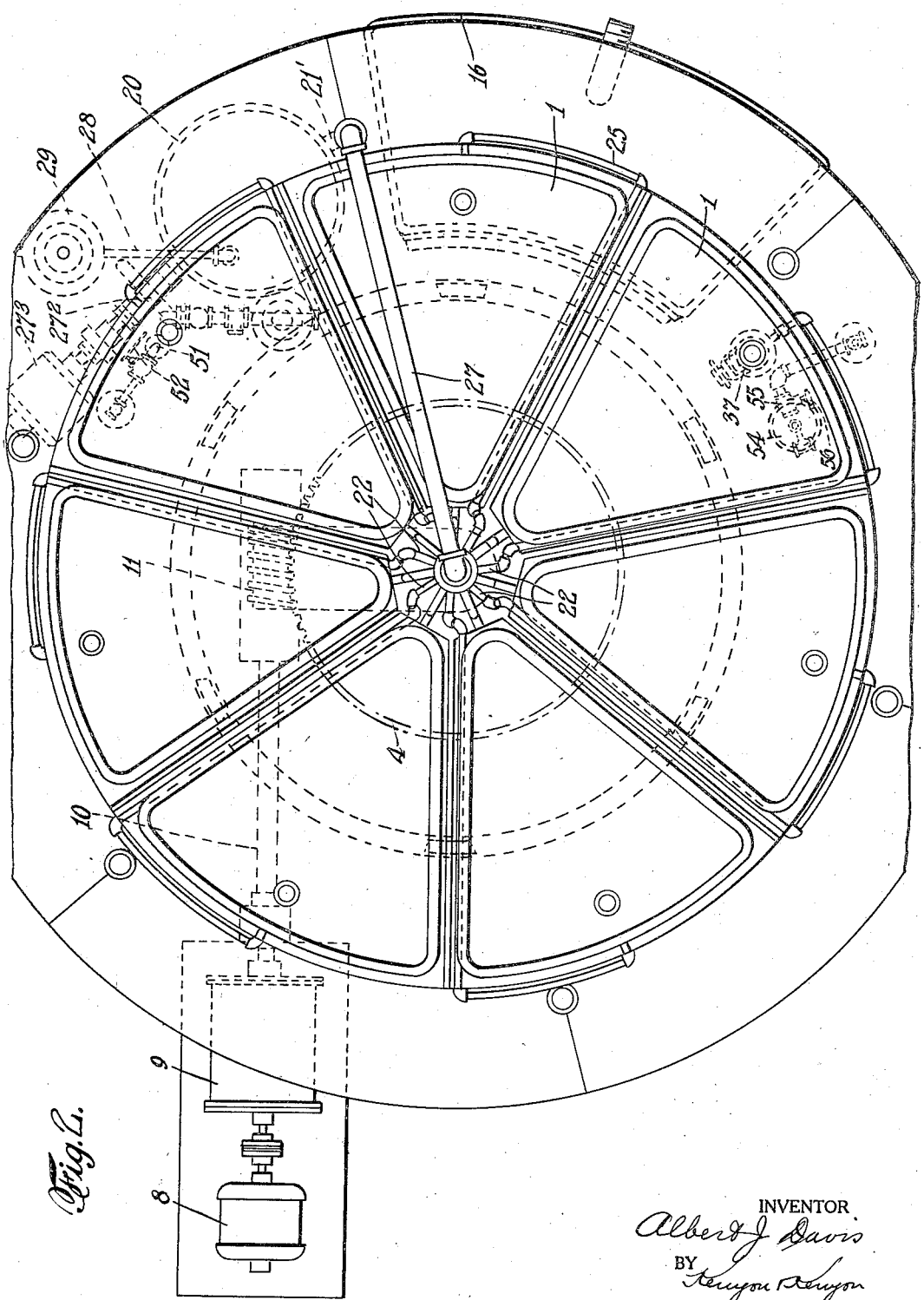

March 30, 1926.
A. J. DAVIS
1,578,267
PASTEURIZING APPARATUS
Filed Nov. 24, 1925 4 Sheets-Sheet 3
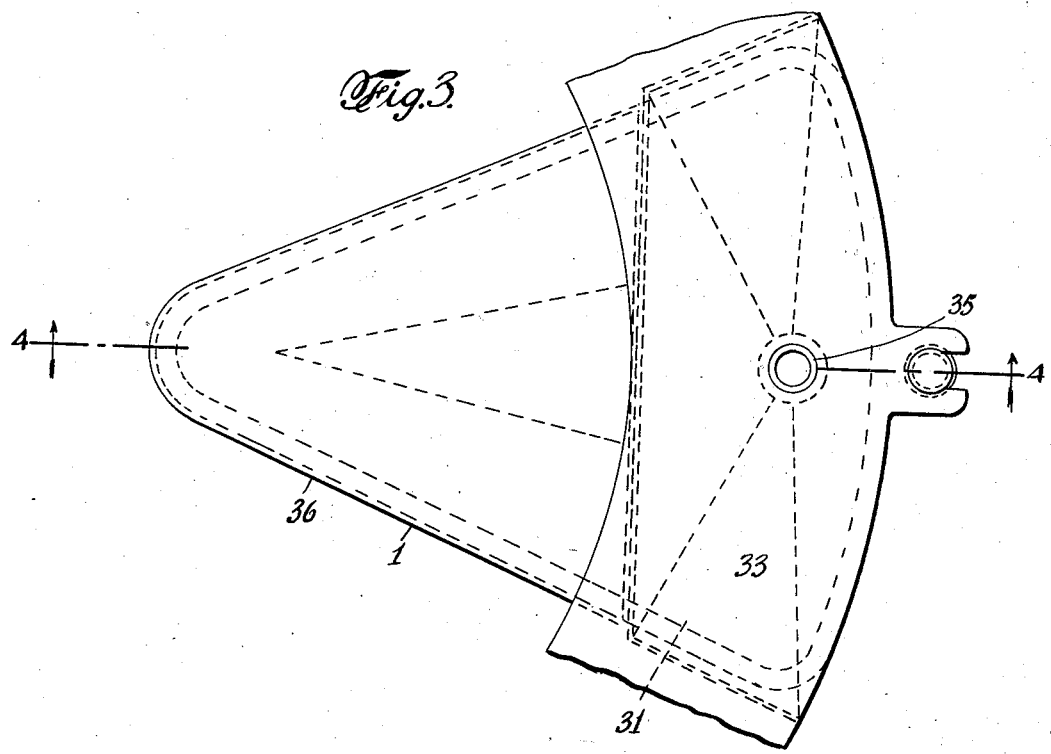
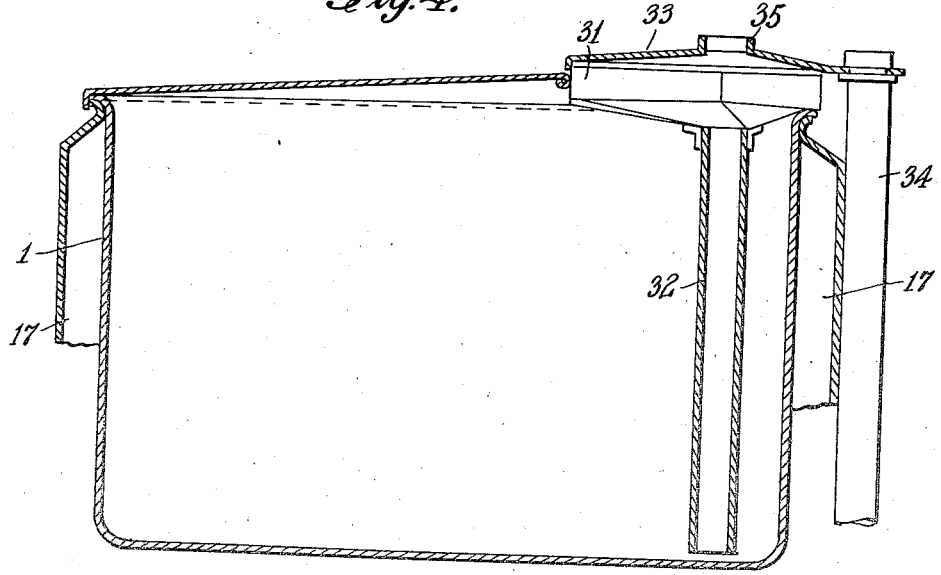
INVENTOR
Albert J. Davis
BY
Kenyon & Kenyon
ATTORNEYS.

March 30, 1926.
A. J. DAVIS
1,578,267
PASTEURIZING APPARATUS
Filed Nov. 24, 1925　　4 Sheets-Sheet 4
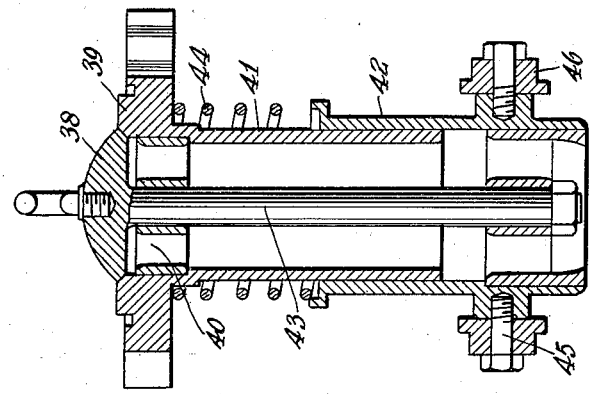
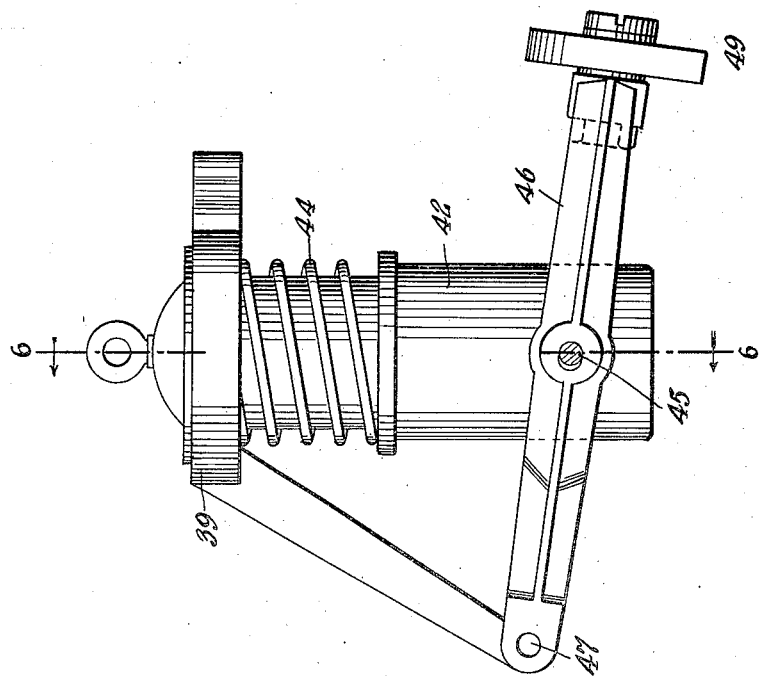
INVENTOR
Albert J Davis
BY
Kenyon & Kenyon
ATTORNEYS Patented Mar. 30, 1926.

1,578,267

UNITED STATES PATENT OFFICE.

ALBERT J. DAVIS, OF NEW YORK, N. Y.

PASTEURIZING APPARATUS.

Original application filed June 29, 1925, Serial No. 40,135. Divided and this application filed November 24, 1925. Serial No. 71,206.

*To all whom it may concern:*

Be it known that I, ALBERT J. DAVIS, a citizen of the United States, residing at New York city, in the county and State of New York, have invented new and useful Improvements in Pasteurizing Apparatus, of which the following is a specification.

My invention relates to Pasteurizing apparatus, the invention described and claimed in this application being an improvement upon that described and claimed in my application Ser. No. 671,806, filed October 30th, 1923. This application is a division of my application Ser. No. 40,135, filed June 29, 1925.

In Pasteurizing milk, the milk is heated to a suitable temperature, say about 145° F., and held for a definite time, say about thirty minutes, at that temperature. This treatment causes practically all of the bacteria in the milk to be destroyed.

One of the objects of the invention is to provide improved apparatus for receiving the milk and holding the same during Pasteurization.

Other objects, features and advantages of the invention will be apparent from the following detailed description and the appended claims.

The accompanying drawings forming a part of this specification illustrate one embodiment of the invention.

In the drawings,

Fig. 1 is a view partly in elevation and partly in section of the said embodiment of my invention.

Fig. 2 is a plan view of the same, the covers and milk receiving pans for the milk holders being omitted.

Fig. 3 is a plan view of one of the milk holders showing the covers thereon.

Fig. 4 is a vertical section taken on line 4—4 of Fig. 3.

Fig. 5 is a detailed view in elevation of the outlet valve of the milk holders; and Fig. 6 is a section taken on line 6—6 of Fig. 5.

Referring to Figs. 1 and 2, a plurality of milk holders 1 are arranged symmetrically about a common axis, the holders as shown being sector-shaped in horizontal cross section and being supported by a base plate or frame 2 which is mounted for rotation about a stationary shaft 3 whose axis is coincident with the vertical axis about which the holders are arranged. The base plate 2, as shown, rests upon the hub of worm gear 4 which latter rests upon the projecting portion 5 of the bed plate 6, a flat bearing 7 of antifriction material being arranged between the gear 4 and the frame portion 5 of the bed plate to permit rotation of the gear 4 without undue friction. The gear 4 is secured, as by a key (not shown), to the member 2 so that rotation of the gear 4 effects rotation of the member 2 and the milk holders 1 about the axis of the shaft 3. The gear 4 is, as shown, driven from a motor 8 which is connected with the gear 4 through reduction gearing 9, shaft 10 and worm 11. The holder is rotated at such a speed that it makes one complete revolution in somewhat over the Pasteurizing period, say in about 42 minutes where seven holders are employed, as shown. The reason the period of rotation exceeds the Pasteurizing period is to enable suitable time for the emptying and refilling of each holder during a single rotation after Pasteurizing of a supply of milk in the holder is complete. To avoid undue strain upon the member 2, I provide the said member with an annular depending rail 12 which rests upon rollers 14 carried by suitable standards 15 arising from the bed plate 6. A stationary tank 16 is arranged to receive the Pasteurized milk discharged from the holder 1.

In order to maintain the milk in the holders 1 at the desired temperature, each of the holders, as shown, is provided with a jacket 17 through which a heating fluid such as water is adapted to be circulated. Each jacket, as shown, surrounds the sides and the bottom of its holder 1, the water being preferably admitted to the jacket adjacent the bottom and inner end of the holder, as shown at 18, and being drawn off from the jacket near the upper outer portion of the holder, as shown at 19. The heating water is supplied from a reservoir 20 (Fig. 2) which communicates through the pipe or conduit 21 with the interior of the shaft 3. The water travels upwardly through the hollow interior of this shaft and the extension 3' rotatably mounted thereon to pipes or conduits 22 which extend from lateral openings in said extension to the openings 18 in the jacket 17 respectively. With this arrangement the supply of heating fluid to the jackets 17 may take place during the rotation of the holders 1 about the shaft 3. To secure a fluid tight connection between the extension 3' and the shaft 3, I provide a suitable stuffing box 24 between the said shaft and extension. The heating fluid from the jackets is carried through pipes or conduits 25 to lateral openings in the portion of the extension 3' above the lateral openings to which the supply pipes 22 are connected, a horizontal wall 26 separating the portion of the extension 3' which supplies heating fluid to the pipes 22 from the portion of the said extension into which said heating fluid is returned from the pipes or conduits 25. From the upper part of the extension 3' the heating fluid is returned through a conduit 27 to the reservoir 20. A fluid tight joint between the upper part of extension 3', and the conduit 27 is provided by the stuffing box 27'. The force for circulating the heating fluid through the various conduits and jackets may be supplied by any suitable means, such as the centrifugal pump $27^2$ connected with the pipe 21 leading to the lower end of the shaft 3. The pump $27^2$ may be driven by any suitable means such as the electric motor $27^3$.

The heating fluid should be slightly warmer than the temperature at which it is desired to maintain the milk. For example, if the milk is to be maintained at a temperature of 145° F. the water as it enters the jackets may have a temperature of about 150° F., the temperature of the water as it leaves the jackets being slightly cooler, say 148° F.

As the same body of water or other heating fluid is repeatedly circulated through the jackets 17, it is desirable to provide means to heat the same to maintain the temperature thereof approximately constant. To this end I employ a suitable source of heat such as the steam supply 28 leading to the reservoir 20. This steam supply is controlled by the thermostat 29 in such a way that when the temperature of the water in the reservoir 20 drops below a predetermined point, the thermostat 29 automatically opens its steam valve to admit steam to the reservoir, the supply of steam being shut off as soon as the temperature of the water in the said reservoir reaches a desired predetermined point. Any suitable form of thermostat controlled by the temperature of the water in the reservoir 20 may be employed. Such thermostats are well known and can be bought on the market.

The above described apparatus for applying heat to the milk holders to maintain the milk in the holders at the desired temperature is claimed in my copending application Ser. No. 40,135, of which this is a division.

To sterilize the tanks before Pasteurization, steam, say under about two lbs. pressure, is admitted to the jackets 17 from a pipe 21' controlled by a valve $22^2$. This steam heats the inner walls of the holders 1 so as to effectively sterilize them.

In order to prevent objectionable radiation of heat from the upper parts of the holders 1 and also to prevent objectionable foreign matter from falling into the milk, I provide the holders with suitable covering means. These means are designed to permit the admission of milk into the holders from a single source of supply (not shown) during the rotation of the holders.

Referring to Figs. 3 and 4, each holder is provided at its outer portion with a pan 31 into which the milk is supplied and from which it enters the holder through a vertical pipe or conduit 32 having an outlet near the bottom of the holder. This arrangement permits the supply of the milk to the holders without foaming. All of the pans or receivers 31 are, as shown, covered by an annular cover 33 which is carried by suitable supports 34. This cover has an inlet opening 35 through which the milk is supplied to the successive pans 31 as they pass under the said inlet. Each of the holders 1 is provided inwardly of the pans 31 with a detachable cover 36.

To permit discharging of the milk from the various holders into the receiving tank 16 the holders are provided with outlet valves 37 shown in detail in Figs. 5 and 6. These valves, as shown, comprise a movable valve member 38 adapted to be seated upon port member 39 so as to enclose the port 40 extending therethrough. The port member 39 has depending therefrom an outlet pipe or conduit 41 upon which a sleeve 42 fits for sliding longitudinal movement. The valve member 38 is connected to the sleeve 42 through the rod 43. A spring 44 arranged between the bottom of the port member 39 and the upper edge of the sleeve 42 tends to hold the said sleeve depressed so as to yieldingly hold the valve 38 in closed position. To permit opening of the valve the sleeve 42 is connected as at 45 to a lever 46 pivoted at 47 to arm 48 depending downwardly from the member 39. As shown in Fig. 5, the lever 46 is connected to the sleeve 42 by a connection which permits angular and also the necessary slight longitudinal movement of the lever 46 with respect to the sleeve 42. The lever 46 carries at its free end a roller 49 which is arranged to travel over a cam 50 on the receiving tank 16. This cam is designed so that as the outlet valve 37 for each holder 1 comes completely into register with the said tank 16 the lever 46 is elevated by the cam to open the outlet valve 37 and hold the same open during the rotation of the holder to permit the complete discharge of the milk from the holder, the cam permitting the spring 44 to automatically close each outlet valve 37 before that valve has passed out of register with the tank 16.

To avoid contamination of the milk it is highly desirable that the outlet valves 37 be maintained clean and free from contaminating matter. I accordingly provide means for sterilizing each of said valves before the milk is discharged therefrom and also means for rinsing same after the discharge of the milk. The sterilizing means comprise a steam nozzle 51 which is arranged to inject steam into the bottom of each of the valves 37 before that valve passes into register with the tank 16. The steam may be supplied to this nozzle from any suitable source (not shown). This nozzle is provided with a steam valve normally yieldingly held closed by suitable means such as a spring (not shown). The valve is provided with an operating lever 52 which is arranged to be depressed by the lever 46 of the valve to effect the opening of the steam valve after the outlet valve 37 passes above and into register with the nozzle 51. After the valve 37 has passed the nozzle 51 the operating member 52 is freed by the lever 46 and permitted to move to shift the steam valve to closed position.

The rinsing valve is arranged to spray each outlet valve 37 with water promptly after the discharge of the milk through said valve. The spraying means, as shown, comprise an annular pipe 54 which is connected with a suitable source of water supply (not shown) through valve 55. Said valve is normally closed but is adapted to be opened by depression of its operating lever 56 by the lever 46 of the outlet valve 37 when the latter valve comes into register with the spraying device. As soon as the lever 46 has passed over the spraying valve lever 56, the valve 55 is automatically closed by suitable means (such as a spring not shown).

The operation is thought to be clear from the foregoing detailed description. The milk to be Pasteurized is supplied from a suitable holder (not shown) to the successive holders 1 shortly after the latter have discharged their previous contents into the receiver 16 and the corresponding valves 37 have passed out of register with said receiver. The holders 1 are continuously moved about the axis of the shaft 3 and hold the successive portions of milk separated from and uncontaminated by each other. The holders 1 after slightly less than a complete rotation about the axis of the shaft 3 come into register with the receiving tank 16 and automatically discharge into the same, each portion of milk having been held in its holder 1 for the Pasteurizing period. The milk discharged into the tank 16 may be led to a suitable reservoir (not shown) which supplies a suitable cooler (not shown).

While I have described one embodiment of my invention, it is understood that I am not to be limited thereto and that changes within the scope of the appended claims may be made without departing from the spirit of the invention.

Having thus described my invention, what I claim as new and desire to secure by Letters Patent of the United States is:—

1. In apparatus for Pasteurizing milk, the combination of a plurality of movable holders each provided with a milk receiver and means for conveying the milk from said receiver to the lower portion of the holder, and a stationary cover for said receivers having means for admitting milk to said receivers while the cover is in position with respect to said holders.

2. In apparatus for Pasteurizing milk, the combination of a plurality of holders rotatable about a common axis, each of said holders being provided at the outer portions thereof with a milk receiver and means for conveying the milk from said receiver to the lower portion of the holder, and a stationary annular cover for said receivers having means for admitting milk to said receivers while the cover is in position with respect to said holders.

3. In apparatus for Pasteurizing milk, the combination of a plurality of holders rotatable about a common axis, each of said holders being provided at the outer portions thereof with a milk receiver and means for conveying the milk from said receiver to the lower portion of the holder, a stationary annular cover for said receivers having means for admitting milk to said receivers while the cover is in position with respect to said holders, and a cover on each of said holders inwardly of said annular cover.

4. In apparatus for Pasteurizing milk, the combination of a plurality of movable holders each provided with a milk pan and a conduit for conveying the milk from said pan to the lower portion of the holder, and a stationary cover for said pans having means for admitting milk to said pans while the cover is in position with respect to said holders.

5. In apparatus for Pasteurizing milk, the combination of a plurality of holders rotatable about a common axis, each of said holders being provided at the outer portions thereof with a milk pan and a conduit for conveying the milk from said pan to the lower portion of the holder, a stationary annular cover for said pans having means for admitting milk to said pans while the cover is in position with respect to said holders, and a cover on each of said holders inwardly of said annular cover.

6. The combination of a liquid holder having an outlet valve, a rinsing device having a valve, means for producing a relative movement between said holder and rinsing device whereby said outlet valve and rinsing device are moved into and out of register with each other, and automatic means for opening said rinsing valve when said outlet valve and said rinsing device are in register with each other.

7. The combination of a liquid holder having an outlet valve, a sterilizing device having a valve, means for producing a relative movement between said holder and sterilizing device whereby said outlet valve and sterilizing device are moved into and out of register with each other, and automatic means for opening said sterilizer valve when said outlet valve and said sterilizing device are in register with each other.

8. The combination of a milk holder having an outlet valve, automatic means for opening said valve, a sterilizing device and a rinsing device for said valve, means for producing a relative movement between said holder and said devices whereby said valve registers with said sterilizing device before said valve is opened and with said rinsing device after the valve is closed, and automatic means for rendering said devices operative when in register with said valve.

9. The combination of a liquid holder having an outlet valve, a sterilizing device including a steam nozzle and a valve therefor, means for producing a relative movement between said holder and sterilizing device whereby said outlet valve and nozzle are moved into and out of register with each other, and automatic means for opening said sterilizer valve when said outlet valve and said nozzle are in register with each other.

10. The combination of a plurality of milk holders rotatable about a common vertical axis and each having an outlet valve, automatic means for successively opening said valves, a sterilizing device and a rinsing device for said valves, means for rotating said holders about said axis whereby said valves are successively brought into register with the sterilizing device before being opened by said automatic means and whereby said valves are successively brought into register with said rinsing device after discharge of the milk from the respective holders, and automatic means for rendering said device operative when in register with a valve.

11. The combination of a plurality of milk holders rotatable about a common axis and each having an outlet valve, a sterilizing device including a steam nozzle and a valve therefor, means for rotating said holders about said axis whereby said outlet valves are successively moved into and out of register with said nozzle, and automatic means for opening the sterilizer valve when one of said outlet valves and said nozzle are in register with each other.

12. The combination of a plurality of milk holders rotatable about a common vertical axis and each having an outlet valve, a rinsing device having a valve, means for rotating said holders about said axis whereby said outlet valves are successively moved into and out of register with said rinsing device, and automatic means for opening said rinsing device valve when one of said outlet valves is in register with said rinsing device.

In testimony whereof, I have signed my name to this specification.

ALBERT J. DAVIS.